(12) United States Patent
Barry et al.

(10) Patent No.: US 7,774,452 B2
(45) Date of Patent: Aug. 10, 2010

(54) METHOD AND APPARATUS FOR SCALING A USER INTERFACE ADAPTIVELY TO AN OBJECT DISCOVERY/DISPLAY SYSTEM WITH POLICY DRIVEN FILTERING

(75) Inventors: Patrick A. Barry, Burlington, NC (US); Heather J. Hartman, Newark, DE (US); Joshua H. Levy, Durham, NC (US); Shelley Saxena, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 12/236,247

(22) Filed: Sep. 23, 2008

(65) Prior Publication Data

US 2009/0019144 A1 Jan. 15, 2009

Related U.S. Application Data

(62) Division of application No. 10/753,185, filed on Jan. 5, 2004, now Pat. No. 7,472,185.

(51) Int. Cl.
*G06F 15/173* (2006.01)
(52) U.S. Cl. .................. 709/223; 709/218; 709/224
(58) Field of Classification Search .................. 709/200, 709/217–219, 223–224; 715/273, 764, 765; 455/41.2, 550.1, 566, 557
See application file for complete search history.

(56) References Cited

U.S. PATENT DOCUMENTS

| | | | |
|---|---|---|---|
| 6,233,686 B1 | 5/2001 | Zenchelsky et al. | |
| 6,389,534 B1 | 5/2002 | Elgamal et al. | |
| 6,421,716 B1 | 7/2002 | Eldridge et al. | |
| 6,829,615 B2 * | 12/2004 | Schirmer et al. ................... | 1/1 |
| 7,127,493 B1 | 10/2006 | Gautier | |
| 7,149,729 B2 * | 12/2006 | Kaasten et al. ..................... | 1/1 |
| 7,206,841 B2 | 4/2007 | Traversat et al. | |
| 7,272,407 B2 | 9/2007 | Strittmatter et al. | |
| 7,409,644 B2 * | 8/2008 | Moore et al. ................ | 715/774 |
| 7,519,575 B1 * | 4/2009 | Simpson et al. .................... | 1/1 |
| 2002/0062375 A1 | 5/2002 | Teodosiu et al. | |
| 2002/0073075 A1 | 6/2002 | Dutta et al. | |
| 2003/0067912 A1 | 4/2003 | Mead et al. | |
| 2004/0162871 A1 | 8/2004 | Pabla et al. | |

OTHER PUBLICATIONS

Suri et al., "Toward DAML-Based Policy Enforcement for Semantic Data Transformation and Filtering in Multi-Agent Systems", ACM, AAMOS, Jul. 14, 2003, pp. 1132-1133.

* cited by examiner

*Primary Examiner*—Faruk Hamza

(57) ABSTRACT

The present invention provides a method, apparatus and computer instructions for scaling a user interface adaptively to an object discovery or display system with policy driven filtering. A number of filters are defined by the user in an initial setup. The filter includes a target number of discovered objects and a metric for filtering discovered objects. Once the initial setup is complete, the present invention automatically triggers or deactivates the filters and dynamically applies one or more filters based on the number of discovered objects and rules defined by the user. Resulting discovered objects are displayed in the user interface to the user.

6 Claims, 5 Drawing Sheets

METHOD AND APPARATUS FOR SCALING A USER INTERFACE ADAPTIVELY TO AN OBJECT DISCOVERY/DISPLAY SYSTEM WITH POLICY DRIVEN FILTERING

This application is a divisional of application Ser. No. 10/753,185, filed Jan. 5, 2004, status allowed.

BACKGROUND OF THE INVENTION

1. Technical Field

The present invention relates generally to an improved data processing system. In particular, the present invention provides a method and apparatus for displaying discovered objects to the user. Still more particularly, the present invention provides a method, apparatus and computer instructions for adaptively scaling a user interface to an object discovery/display system with policy-driven filtering.

2. Description of Related Art

With the increasing use of mobile devices, such as cellular phones, pagers, laptop computers, personal digital assistants (PDAs), communications between users of these devices also increase. Communications are made to exchange information, such as, for example, emails, instant messages, images, and files. Conventionally, when a user wants to communicate with one another through the use of a mobile device, the user first tries to connect to a peer discovery system, which discovers all mobile devices that are within the range of a certain bandwidth. Common wireless communication protocols, such as bluetooth or wireless fidelity (Wi-Fi), are generally used for connecting these mobile devices. Bluetooth is a standard protocol, available from bluetooth SIG, for short-range radio links between devices. Bluetooth replaces links currently supported by many cables. Wireless fidelity (Wi-Fi) is a networking technology that uses IEEE 802.11a or IEEE 802.11b standard to provide fast, secure and reliable wireless connectivity. A peer-to-peer environment may use the above technologies to share information between devices or share an Internet connection.

When the mobile device is connected to the peer discovery system, available peers, meaning other mobile device users, are displayed in a user interface to allow the user to interact with the user's peers. However, as the number of available peers or discovered objects becomes large, it becomes difficult and unwieldy for the user to look through the large number of available peers for one with which to interact. This difficulty is magnified by the small displays that are available on most mobile devices, such as mobile phones and PDAs. Thus the issue of how to filter discovered objects in order to adequately display to the user becomes a problem.

Currently, existing object discovery or display systems often filter discovered objects using built-in rules, which the user has no control over. In addition, existing systems follow a pre-set order of filtering, where one rule follows another immediately without considering the dynamic nature of discovered objects.

Therefore, it would be advantageous to have an improved method, apparatus and computer instructions for scaling a user interface to an object discovery or display system with policy-driven filtering that allows users to define filtering rules and dynamically applies filters to discovered objects as appropriate.

SUMMARY OF THE INVENTION

The present invention provides a method, apparatus and computer instructions for scaling a user interface to an object discovery or display system with policy-driven filtering. The mechanism of the present invention allows users to define rules of filtering or policies, in order to filter the number of discovered objects to be displayed in a user interface.

The present invention allows a user to first define a number of filters to apply on discovered objects in an initial setup. The user then defines a target number of discovered objects and a metric for each filter.

Once the initial setup is complete, the present invention dynamically triggers or deactivates defined filters based on the number of discovered objects. If a filter is triggered, the present invention filters discovered objects according to the metric defined for the filter. The present invention then displays filtered discovered objects in the user interface. In the absence of a filter in the initial setup, none of the discovered objects are filtered.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As is known in the art, object discovery is typically performed in a peer-to-peer environment in which an object discovery or display system exists on at least two computing devices that communicate with one another by way of a wireless communication protocol, such as bluetooth or Wi-Fi. Therefore, in order to provide a context in which the present invention may be implemented, the following description of a peer-to-peer environment is provided.

Figure 1:
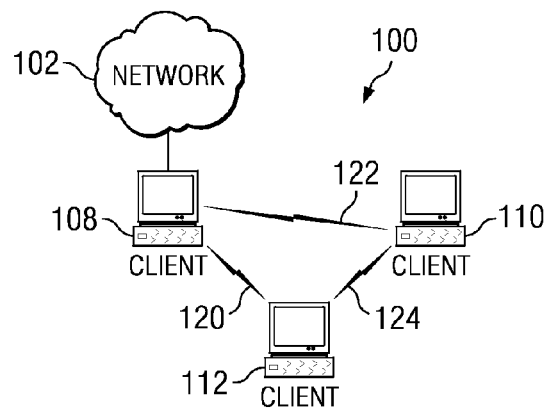
FIG. 1 is a pictorial representation of a peer-to-peer environment in which the present invention may be implemented in accordance with a preferred embodiment of the present invention.

With reference now to the figures, FIG. 1 depicts a pictorial representation of a peer-to-peer environment in which the present invention may be implemented. Peer-to-peer environment 100 is an exemplary environment in which the present invention may be implemented.

In the depicted example, peer-to-peer environment 100 includes clients 108, 110, and 112. These may be, for example, personal computers, network computers or personal digital assistants (PDAs). Peer-to-peer environment 100 also may include additional clients, and other devices not shown. Each client in peer-to-peer environment 100 may be connected to the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

In the depicted example, peer-to-peer environment 100 also includes communication links 120, 122 and 124. When client 108 connects to the peer discovery system, which resides on client 108, the peer discovery system tries to connect with other clients, such as client 110 and 112, through the use of communication links 120 and 122. Communications links 120 and 122 may be implemented in various forms, such as wire, wireless communication links, or fiber optic cables. In the depicted example, communication links 120 and 122 are implemented using bluetooth, which is a common wireless communication protocol. Similarly, client 110 and 112 are connected through the use of communication link 124, which is also implemented as a bluetooth connection.

Typically, a connection is made when the peer discovery system of a first client, such as client 110, broadcasts a User Datagram Protocol (UDP) message. This message is received by available clients over a local subnet. For example, the peer discovery system of a second client, such as client 112, receives the broadcast message and decides whether to make a connection with client 110. If client 112 accepts client 110 after filtering is performed, a connection is made. In the prior art, client 112 filters discovered objects, such as client 110, based on a set of established rules in the system and a set of pre-set orders to apply those rules. However, using the innovative feature of the present invention, the user of client 112 may create user defined rules to filter the clients to be displayed in the user interface. These rules may be based on the target number of objects and metrics, such as common interests, and type of hardware used.

Once a connection is made using communication links, such as communication links 120 and 122, the peer discovery system displays available clients 110 and 112 to client 108 in a user interface as discovered objects.

In addition to a wireless implementation, peer-to-peer environment 100 also may be implemented as a number of different types of networks, such as for example, an intranet, a local area network (LAN), or a wide area network (WAN). FIG. 1 is intended as an example, and not as an architectural limitation for the present invention.

Figure 2:
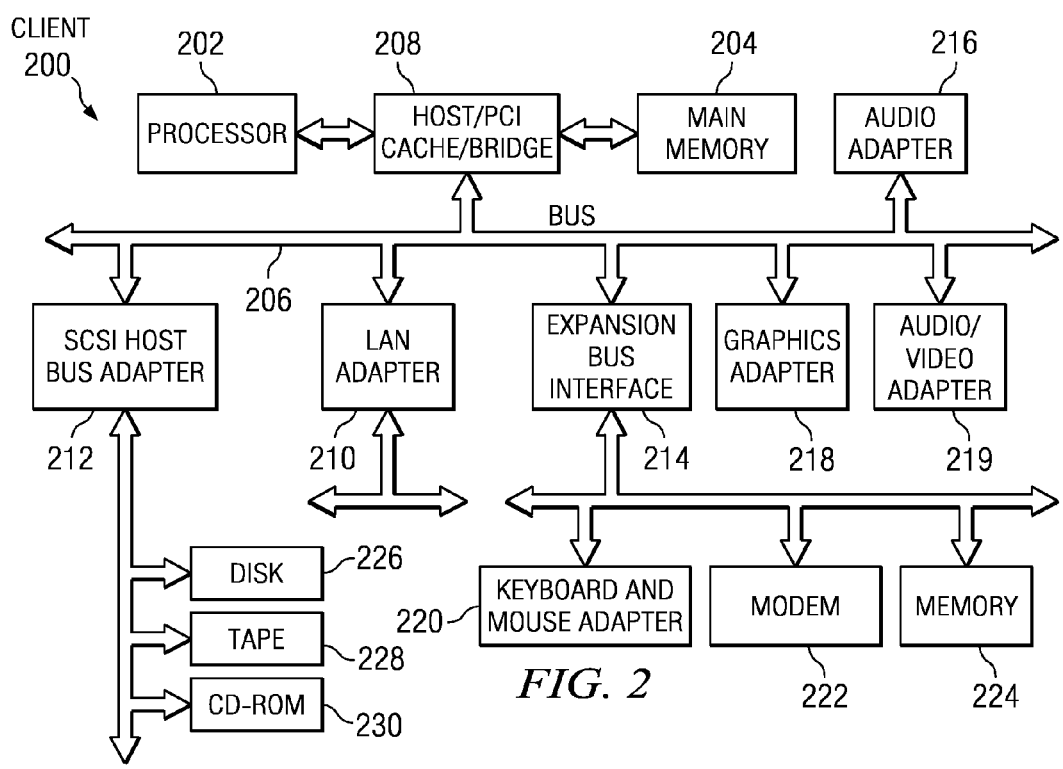
FIG. 2 is a block diagram of a data processing system in which the present invention may be implemented.

Referring to FIG. 2, a block diagram of a computing device that may be implemented as a client, such as clients 108, 110, and 112 in FIG. 1, is shown in which the present invention may be implemented. Computing device 200 is an example of a computer, such as a laptop computer or a workstation, in which code or instructions implementing the present invention may be located. Computing device 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. To contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within computing device 200 in FIG. 2. The operating system may be a commercially available operating system such as Windows XP, which is available from Microsoft Corporation. Instructions for the operating system and applications or programs are located on storage devices, such as hard disk drive 226, and may be loaded into main memory 204 for execution by processor 202.

Those of ordinary skill in the art will appreciate that the hardware depicted in FIG. 2 may vary depending upon the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, computing device 200, if optionally configured as a network computer, may not include SCSI host bus adapter 212, hard disk drive 226, tape drive 228, and CD-ROM 230. In that case, the computer, to be properly called a client computer, includes some kind of network communication interface, such as LAN adapter 210, modem 222, or the like. As another example, data processing system 200 may be a stand-alone system configured to be bootable without relying on some type of network communication interface, whether or not computing system 200 comprises some type of network communications interface.

The depicted example in FIG. 2 and above-described examples are not meant to imply architectural limitations. Computing system 200 also may include any type of computing device that is capable of running an instant messaging client application without departing from the spirit and scope of the present invention. Examples of such computing devices include, but is not limited to, personal digital assistants (PDAs), laptop computers, network computers, wireless telephones, pager devices, and the like.

Figure 3:
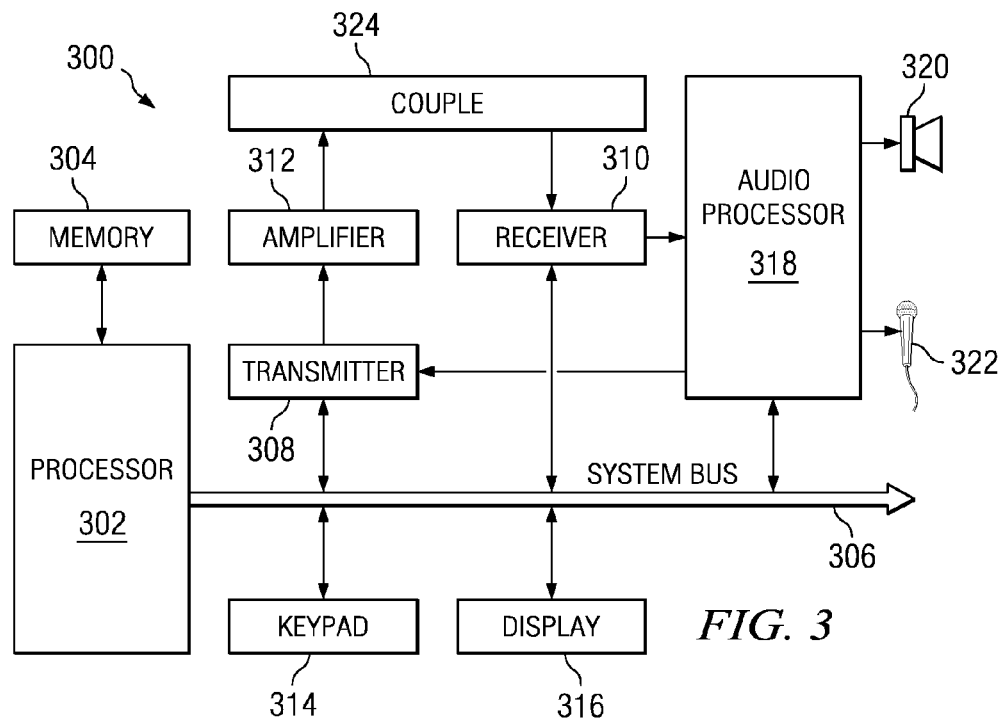
FIG. 3 is an exemplary block diagram of a wireless communication device in which the present invention may be implemented in accordance with a preferred embodiment of the present invention.

With reference to FIG. 3, an exemplary block diagram of a wireless communication device in which the present invention may be implemented is depicted in accordance with a preferred embodiment of the present invention. Wireless communication device 300 includes a processor 302 for controlling operation of the communication device and a memory 304. The processor 302 may be a general-purpose microprocessor operating under the control of instructions stored in memory, such as memory 304, or device-specific circuitry for controlling the operation of the telephone device. Processor 302 is connected by system bus 306 to transmitter 308, receiver 310, keypad 314, display 316, and audio processor 318. Keypad 314 may be a keypad and/or buttons. Display 316 may be any type of display device including a liquid crystal display (LCD) or other known displays, such as a cathode ray tube or active matrix display.

Transmitter 308 and receiver 310 are coupled to a telephone signal by couple 324 to provide full duplex communication. The telephone signal may be provided by a telephone line (not shown) in a land-based telephone or an antenna, such as for a wireless telephone. Audio processing circuit 318 provides basic analog audio outputs to speaker 320 and accepts analog audio inputs from microphone 322. Received signals are demodulated and decoded by receiver 310. Transmitter 308 encodes and modulates signals passed to it by processor 302 or audio processor 318. The output of the transmitter is amplified by power amplifier 312 to control the power level at which the signal is transmitted.

Processor 302 or audio processor 318 may detect audible call status information and call status codes received by receiver 310. Memory 304 may include a lookup table associating call status information or call status codes with visual call status information, such as text messages. Processor 302 detects or receives a call status code and displays an appropriate call status message on display 316. Those of ordinary skill in the art will appreciate that the hardware depicted in FIG. 3 may vary.

The present invention provides a method, apparatus and computer instructions for scaling a user interface adaptively to an object discovery or display system with policy driven filtering. The present invention allows a user to define an initial setup, which includes a number of filters for filtering discovered objects. For each defined filter, the user specifies a target number of discovered objects to be displayed and a metric for determining a peer's desirability. Examples of metric include common interests, prior interaction, and number of prior connections. An example filter may be used to show only objects with common interest in sports if the number of discovered objects is less than 20 or to show only objects that a user interacted before if the number of discovered objects is less than 30. Once the initial setup is complete, the present invention may dynamically determine which and how many discovered objects are to be displayed in the user interface.

In a preferred embodiment, upon detection of a new discovered object, the present invention checks the total number of discovered objects against the user-defined filters to see if one or more filters are triggered based on the target number of objects. A filter is triggered if the number of discovered objects is greater than or equal to the target number of discovered objects defined in the filter. In a similar manner, upon detection of a disappeared object, which decreases the number of discovered objects, the filter is deactivated if the number of discovered objects is less than the target number of discovered objects defined in the filter.

If at least one filter is triggered, the present invention applies the metric, if defined in the initial setup, for the given filter to each discovered object, in order to determine whether the discovered object should be displayed. If the object does not meet the requirements of the metric, the object is ignored. If the object meets the requirements of the metric, the present invention continues with the next triggered filter to determine whether the object meets the metric of the next triggered filter. Once the object meets metric requirements of all triggered filters, the object is displayed. Thus, each discovered object is checked against the metric of each triggered filter before being displayed.

In addition, the present invention provides a mechanism that dynamically triggers or deactivates filters as the number of discovered object changes. For example, a user may specify a basic filter with a target number of 10, a second filter with a target number of 20 and a third filter with a target number of 30. If the initial number of discovered objects detected is 15, the basic filter is triggered, since 15 is greater than 10. When the number of discovered objects detected is increased to 21, both the first and the second filter are triggered since 21 is greater than 20 and 10. When the number of discovered objects is again increased to 35, all three filters are then triggered since 35 is greater than 30, 20 and 10. When the number of discovered objects is reduced to 27, the first and second filters are triggered since 27 is greater than 20 and 10, however, the third filter is deactivated since 27 is less than 30.

Figure 4:
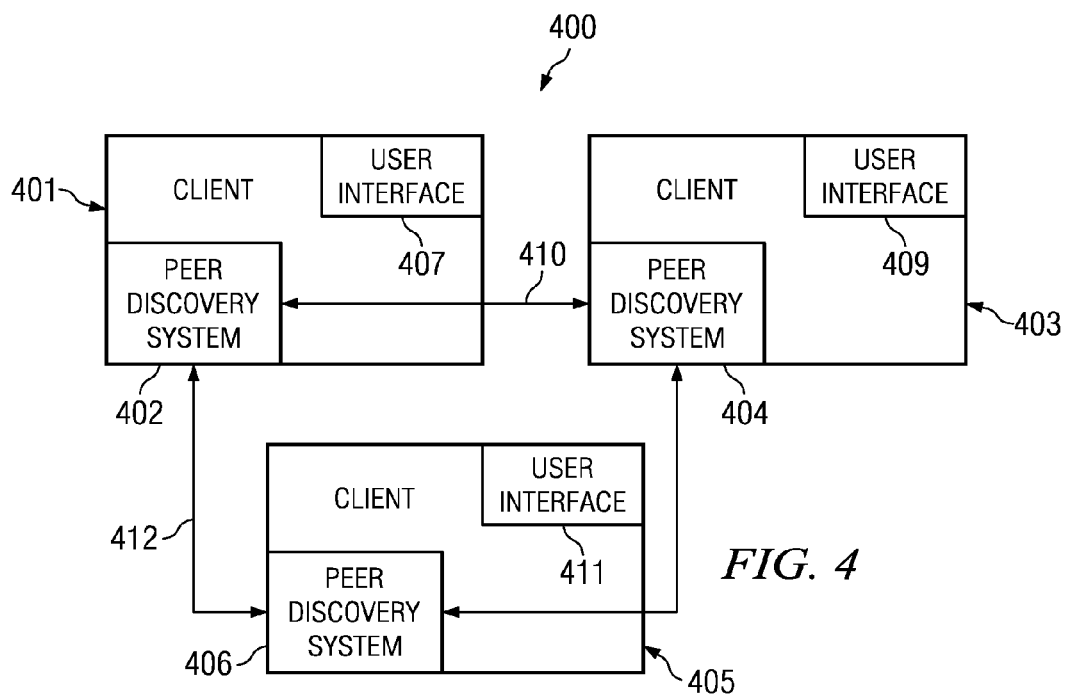
FIG. 4 is a diagram illustrating components used for scaling adaptively to an object discover or display system with policy-driven filtering in accordance with a preferred embodiment of the present invention.

Turning now to FIG. 4, a diagram illustrating components used for scaling adaptively to an object discover or display system with policy-driven filtering is depicted in accordance with a preferred embodiment of the present invention. As depicted in FIG. 4, the present invention may be implemented in a peer-to-peer environment, such as peer-to-peer environment 300 in FIG. 3. Peer-to-peer environment 400 includes peer discovery systems 402, 404 and 406. Peer discovery system 402 may be implemented on client 401, peer discovery system 404 may be implemented on client 403, and peer discovery system 406 may be implemented on client 405. Client 401, 403 and 405 may be implemented as client 108, 110 and 112 in FIG. 1. Client 401, 403 and 405 also include user interfaces 407, 409 and 411, which display filtered discovered objects.

In one example implementation, when client 401 wants to join peer-to-peer environment 400 to interact with other clients, client 401 connects to peer discovery system 402 through the user of user interface 407. Peer discovery system 402 sends a broadcast message over a local subnet using communication link 410 and 412, which may be implemented using common wireless communication protocol such as bluetooth and Wi-Fi. The message includes the IP address and port number of client 401, which provides the receiver client 401's identity.

Upon receiving the message from client 401, peer discovery system 404 of client 403 adaptively filters client 401 based on the user-defined initial setup. If no filter is defined in the initial setup, peer discovery system 404 of client 403 displays client 401 in the user interface. If the current number of objects discovered by client 403 is greater than or equal to the target number specified in one or more filters in the initial setup, at least one filter is triggered. If at least one filter is triggered, peer discovery system 404 then determines whether client 401 meets the metric specified for each filter triggered. If client 401 meets the metric specified for each filter triggered, peer discovery system 404 of client 403 displays client 401 in user interface 409. If client 401 does not meet the metric specified for each filter triggered, client 401 is ignored by peer discovery system 404. Similarly, peer discovery system 406 of client 405 adaptively filters client 401 when the message is received through communication link 412.

Figure 5:
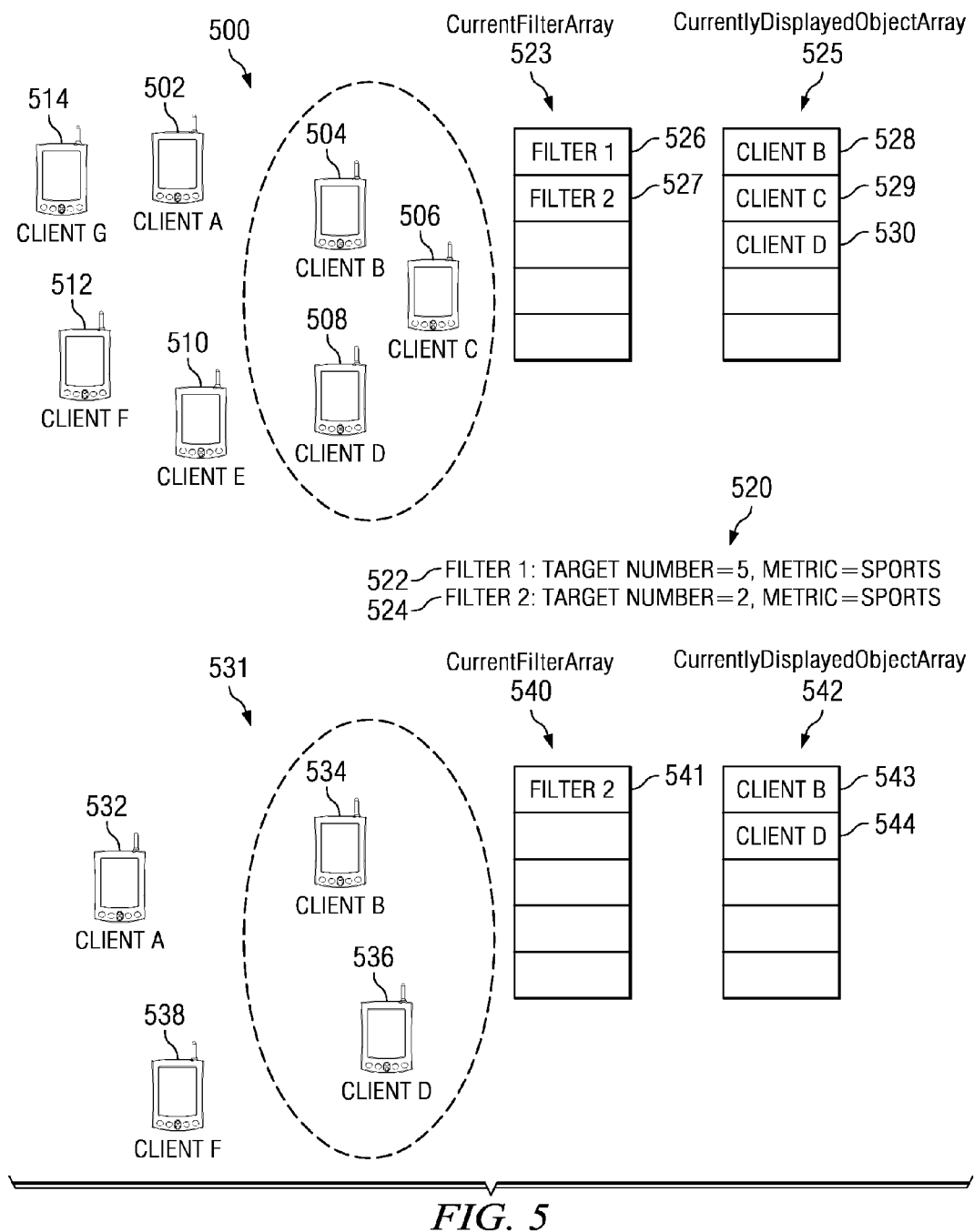
FIG. 5 is a diagram illustrating an example of adaptive scaling a user interface to an object discovery or display system with policy-driven filtering using the present invention in accordance with a preferred embodiment of the present invention.

Turning now to FIG. 5, a diagram illustrating an example of adaptive scaling a user interface to an object discovery or display system with policy-driven filtering using the present invention is depicted in accordance with a preferred embodiment of the present invention. As depicted in FIG. 5, in this example implementation, peer-to-peer environment 500 includes seven clients: client A 502, client B 504, client C 506, client D 508, client E 510, client F 512, and client G 514.

In this example, client A 502 is the client of interest and initial setup 520 is the initial setup of client A 502. The user of client A 502 defines initial setup 520, which includes two filters: filter 1 522 and filter 2 524. Filter 1 522 includes a target number of 5 and a metric of interest in sports. Filter 2 524 includes a target number of 2 and also a metric of interest in sports.

When client A 502 receives broadcast messages from all other clients, peer discovery system running on client A 502 detects that there are six nearby clients: client B 504, C 506, D 508, E 510, F 512 and G 514. Peer discovery system first clears a CurrentFilterArray 523, which is a data structure used to store filters triggered by the number of discovered clients.

Based on initial setup 520 for client A 502, peer discovery system of client A 502 checks the number of discovered clients against the target number specified in defined filters in initial setup 520. In this example, since the number of discovered clients is 6, which is greater than the target number of 5 defined in filter 1 522 and the target number of 2 defined in filter 2 524, both filter 1 526 and filter 2 527 are triggered and added to CurrentFilterArray 523.

Once the filters are added, peer discovery system of client A 502 clears CurrentDisplayedObjectArray 525, which is a data structure used to store discovered objects that meet metric requirements of filters in CurrentFilterArray 523. Next, for each filters stored in CurrentFilterArray 523, peer discovery system of client A 502 determines whether each discovered object meets the metric defined in the filter. In this example, client B 504 meets metric specified in filter 1 526, which has a common interest in sports. Thus, client B 528 is added to CurrentlyDisplayedObjectArray 525.

Peer discovery system of client A 502 then determines whether client B 504 meets metric specified for the next filter in CurrentFilterArray 523, which is filter 2 527. Client B 504 also meets metric of filter 2 527, but client B 504 is already stored in CurrentlyDisplayedObjectArray 525 and therefore is not added. Peer discovery system of client A 502 repeats the same process for client C 506, D 508, E 510, F 512, and G 514. In this example, client C 529 and client D 530 also meet metrics specified for filter 1 526 and filter 2 527, and are therefore added to CurrentlyDisplayedObjectArray 525.

Once peer discovery system of client A 502 completes determination of metric requirements for filters stored in CurrentFilterArray 523, peer discovery system refreshes the user interface of client A 502 and displays all clients stored in CurrentlyDisplayedObjectArray 525 to the user of client A 502.

As clients dynamically join and leave peer-to-peer environment 500, a different peer-to-peer environment, peer-to-peer environment 531, emerged. Peer-to-peer environment 531 includes only four of the seven previous clients: client A 532, client B 534, client D 536, and client F 538. Client A 502 maintains initial setup 520 as specified by the user.

In this example, when client A 532 receives broadcast messages from all other clients, peer discovery system of client A 532 detects only three nearby clients: client B 534, D 536, and F 538. Peer discovery system first clears CurrentFilterArray 523 and checks the number of discovered clients against the target number specified in filters of initial setup 520. In this example, since the number of discovered clients is 3, which is greater than the target number of 2 defined in filter 2 524, but less than the target number of 5 defined in filter 1 522, only filter 2 541 is added to CurrentFilterArray 540. Thus, the present invention allows peer discovery system of client A 532 to trigger or deactivate filters dynamically as the number of discovered object changes.

Once filter 2 is added to CurrentFilterArray 540, peer discovery system of client A 532 clears CurrentDisplayedObjectArray 542 and determines whether each discovered object meets the metric defined in the filter 2 541. In this example, client B 534 and client D 536 meet metric specified in filter 2 541, since both have common interests in sports. Thus, client B 543 and client D 544 are added to CurrentlyDisplayedObjectArray 542.

Once peer discovery system of client A 532 completes determination of metric requirements for filter 2 541 stored in CurrentFilterArray 540, peer discovery system refreshes the user interface of client A 532 and displays all clients stored in CurrentlyDisplayedObjectArray 542 to the user of client A 532.

Thus, using the innovative features of the present invention, the user of a client, such as client A 502, may define one or more filters to filter discovered objects when detected by the client. The user may also define metric requirements for each discovered object for each filter, so that the peer discovery system may adaptively display relevant clients in the user interface. In addition, the present invention dynamically triggers and deactivates the filter as the number of discovered objects changes.

Figure 6:
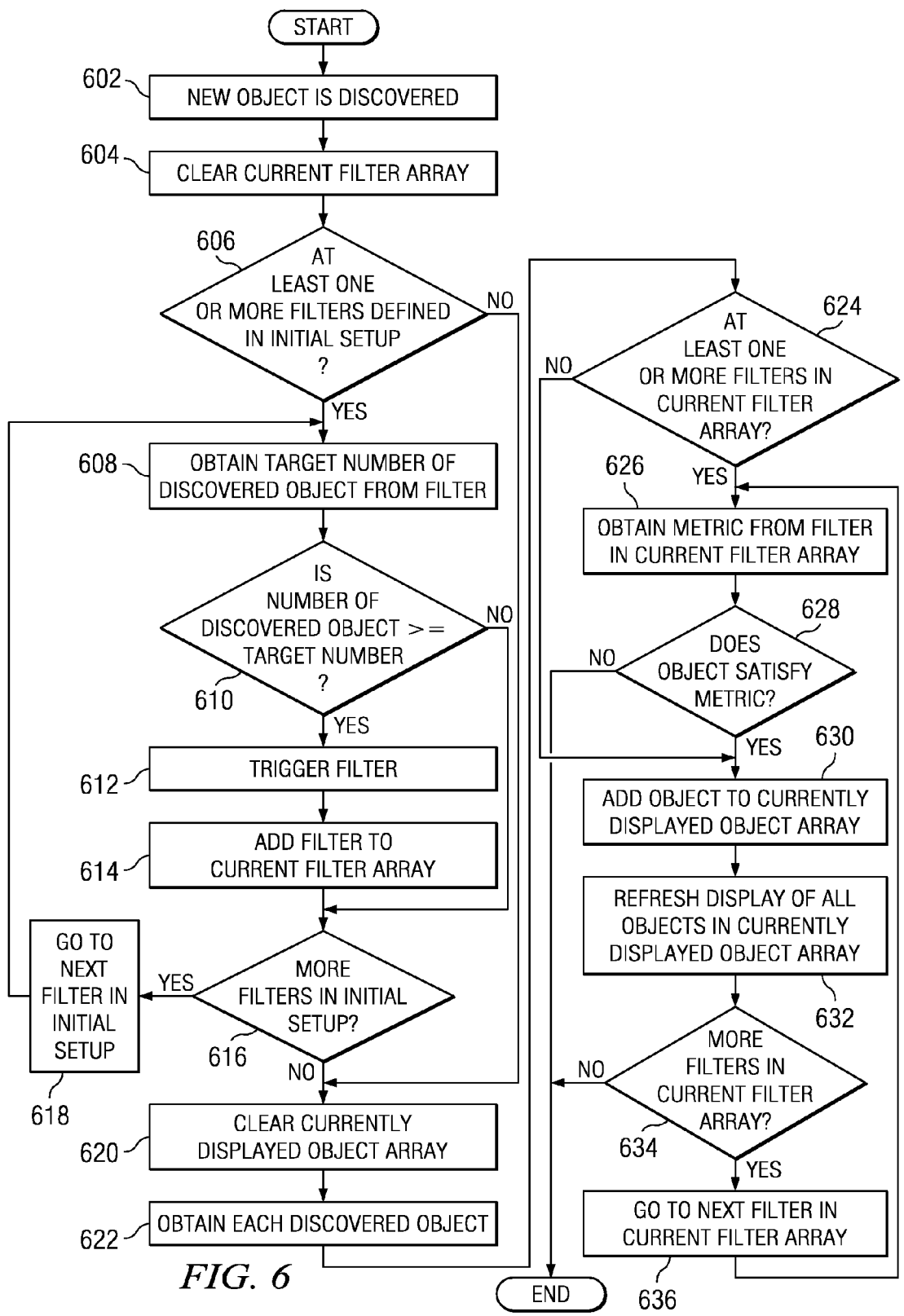
FIG. 6 is a flowchart illustrating an exemplary process for adaptively scaling a user interface to an object discovery or display system with policy-driven filtering when an object is discovered in accordance with the present invention.

With reference to FIG. 6, a flowchart illustrating an exemplary process for adaptively scaling a user interface to an object discovery or display system with policy-driven filtering when an object is discovered is depicted in accordance with the present invention. The process illustrated in FIG. 6 may be implemented in a data processing system such as computing device 200 in FIG. 2 or wireless communications device 300 in FIG. 3.

As depicted in FIG. 6, in this example implementation, the process begins when a new object is discovered by a client (step 602). An object, such as client 110 in FIG. 1, may be discovered when the peer discovery system of a client sends a broadcast message to nearby clients. Next, the receiving client clears its current filter array (step 604), which is a data structure used to store filters triggered by the number of discovered clients.

Then, the peer discovery system of the client checks the initial setup and makes a determination as to whether at least one or more filters are defined (step 606). If no filter is defined in the initial setup, the process continues to step 620. If at least one or more filters are defined in the initial setup, the peer discovery system obtains the target number of discovered objects from the filter stored in the initial setup (step 608). Next, a determination is made by the peer discovery system as to whether the number of discovered objects is greater than or equal to the target number obtained in step 608 (step 610). If the number of discovered objects is greater than or equal to the target number, the filter is triggered (step 612). If the number of discovered objects is less than the target number obtained in step 608, the process continues to step 616.

Continuing from step 612, if at least one filter is triggered, the peer discovery system makes a determination as to whether any additional filter is defined in the initial setup (step 616). If additional filter is defined in the initial setup, the peer discovery system goes to the next filter defined in the initial setup (step 618) and the process continues to step 608. If no additional filter is defined in the initial setup, the peer discovery system clears the currently displayed object array (step 620) and obtains each discovered object (step 622). The currently displayed object array is a data structure used to store discovered objects that meet metric requirements of filters in the current filter array.

Once a discovered object is obtained, a determination is made by the peer discovery system as to whether at least one or more filters are stored in the current filter array (step 624). A filter is stored in the current filter array at step 614 when a filter is triggered at step 612. If no filter is stored in the current filter array, the processor continues to step 630. If at least one filter is stored in the current filter array, the peer discovery system obtains the metric defined from the filter stored in the current filter array (step 626) and a determination is made as to whether the discovered object satisfies the metric defined in the filter (step 628). Examples of metric include number of previous interactions, type of hardware, and interest in sports. If the discovered object does not satisfy the metric, the process terminates thereafter. If the discovered object satisfies the metric, the peer discovery system adds the object to the currently displayed object array (step 630) and refreshes the display of the user interface to show all objects stored in currently displayed object array (step 632).

Once the display of the user interface is refreshed, a determination is made by the peer discovery system as to whether additional filters are stored in current filter array (step 634). If additional filters are stored in the current filter array, the peer discovery system goes to the next filter in the current filter array (step 636) and obtains the metric defined for the next filter (step 626). If no additional filters are stored in the current filter array, the process terminating thereafter.

For a more efficient operation, instead of clearing the currently displayed object filter array, the peer discovery system may check the newly discovered object, after satisfying the metric, against the array to determine whether it is currently stored. If it is not stored, the discovered object may be added to the array.

Figure 7:
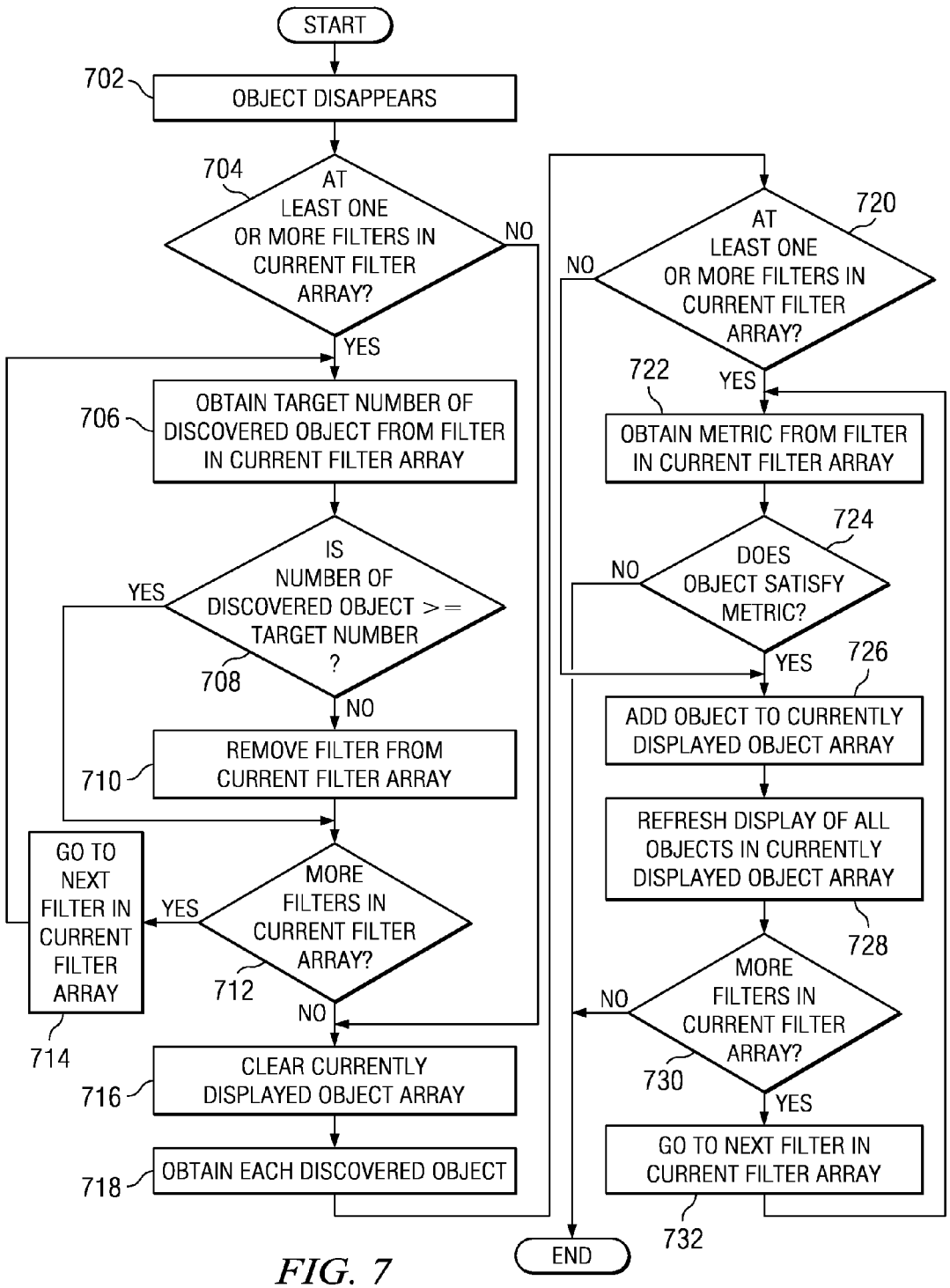
FIG. 7 is a flowchart illustrating an exemplary process for adaptively scaling a user interface to an object discovery or display system with policy-driven filtering when an object disappears in accordance with the present invention.

Turning now to FIG. 7, a flowchart illustrating an exemplary process for adaptively scaling a user interface to an object discovery or display system with policy-driven filtering when an object disappears is depicted in accordance with the present invention. The process illustrated in FIG. 7 may be implemented in a data processing system such as computing device 200 in FIG. 2 or wireless communications device 300 in FIG. 3.

As depicted in FIG. 7, in this example implementation, the process begins when an object disappears (step 702). An object disappears, for example, when a client leaves a peer-to-peer environment. The object disappearance causes a decrease in the number of discovered objects.

Next, a determination is made by the peer discovery system as to whether at least one or more filters are stored in the current filter array (step 704). If at least one or more filters are stored in the current filter array, the peer discovery system obtains the target number of the discovered objects from the filter stored in the current filter array (step 706). If no filter is stored in the current filter array, the process continues to step 716. Continuing from step 706, a determination is made by the peer discovery system as to whether the number of discovered objects is greater than or equal to the target number obtained in step 706. If the number of discovered objects is greater than or equal to the target number, the process continues to step 712. If the number of discovered objects is less than the target number, the filter is removed from the current filter array (step 710). The removal of filter deactivates the filter.

A determination is then made as to whether any additional filter is stored in the current filter array (step 712). If additional filter is stored in the current filter array, the peer discovery system goes to the next filter in the current filter array and obtains the target number of discovered objects defined in the next filter (step 706). If no additional filter is stored in the current filter array, the peer discovery system clears the currently displayed object array (step 716), which is a data structure used to store discovered objects that meet metric requirements of filters in the current filter array. Then, the peer discovery system obtains each discovered object (step 718).

When a discovered object is obtained, a determination is made as to whether at least one or more filters are stored in the current filter array (step 720). If at least one or more filters are stored in the current filter array, the peer discovery system obtains the metric defined in the filter (step 722). If no filter is stored in the current filter array, the process continues to step 726. Once the metric is obtained, a determination is made as to whether the discovered object obtained in step 718 satisfies the metric (step 724). If the discovered object does not satisfy the metric, the process terminating thereafter. If the discovered object satisfies the metric, the discovered object is added to the currently displayed object array (step 726) and the display of all objects in the currently displayed object array is refreshed in the user interface (step 728).

After the display is refreshed, a determination is made as to whether additional filters are stored in the current filter array (step 730). If additional filters are stored in the current filter array, the peer discovery system goes to the next filter in the current filter array (step 732) and obtains the metric in the next filter (step 722). If no additional filters are stored in the current filter array, the process terminating thereafter.

For a more efficient operation, instead of clearing the currently displayed object array, the peer discovery system may obtain each object stored in the currently displayed object array and determines whether the object should be displayed.

Thus, the present invention provides advantages over current peer-to-peer systems by adaptively filtering and displaying relevant and manageable information to the user without restricting the users' interaction to their social networks. In addition, the present invention dynamically adjusts display of discovered objects based on the number of discovered objects and automatically triggers or deactivates one or more filters as appropriate. By allowing the user to define initial setup, the present invention gives users control over what information is to be displayed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a mobile peer to peer data processing system for presenting objects for peer to peer connections, the method comprising:
    identifying a set of objects available for a peer to peer connection;
    selecting a first filter within a plurality of filters to filter the set of objects to form a set of filtered objects, wherein the first filter within the plurality of filters is selected based on the number of objects present in the set of objects and wherein each filter in the plurality of filters includes at least one metric for filtering the set of objects;

deselecting a second filter within the plurality of filters, wherein the second filter is deselected based on the number of objects present in the set of objects; and presenting the filtered objects, wherein an object within the set of filtered objects is selected for the peer to peer connection.

2. The method of claim 1, wherein at least one metric for filtering the set of objects comprises one of number of previous interactions, type of hardware used, or common interest.

3. The method of claim 1, wherein presenting the filtered objects comprises at least one of displaying the filtered objects in a user interface, or providing an audible output of the filtered objects to the user.

4. The method of claim 1, wherein the peer to peer connection comprises a wireless communication protocol.

5. The method of claim 1, wherein identifying the set of objects comprises receiving a message from a peer over the peer to peer connection.

6. The method of claim 1, wherein each filter in the plurality of filters comprises a target number of objects.

* * * * *